(12) United States Patent
Lejeune

(10) Patent No.: US 10,958,941 B2
(45) Date of Patent: Mar. 23, 2021

(54) SIGNAL ENCODING AND DECODING FOR HIGH CONTRAST THEATRICAL DISPLAY

(71) Applicant: Ymagis, Malakoff (FR)

(72) Inventor: Cédric Lejeune, Malakoff (FR)

(73) Assignee: YMAGIS, Paris (FR)

( * ) Notice: Subject to any disclaimer, the term of this patent is extended or adjusted under 35 U.S.C. 154(b) by 0 days.

(21) Appl. No.: 16/487,853

(22) PCT Filed: Feb. 1, 2018

(86) PCT No.: PCT/EP2018/052530
§ 371 (c)(1),
(2) Date: Aug. 22, 2019

(87) PCT Pub. No.: WO2018/153633
PCT Pub. Date: Aug. 30, 2018

(65) Prior Publication Data
US 2020/0059673 A1 Feb. 20, 2020

(30) Foreign Application Priority Data

Feb. 24, 2017 (EP) ..................................... 17305208

(51) Int. Cl.
*H04N 9/31* (2006.01)
*H04N 19/85* (2014.01)
(Continued)

(52) U.S. Cl.
CPC .............. *H04N 19/85* (2014.11); *G09G 5/02* (2013.01); *G09G 5/10* (2013.01); *H04N 9/3182* (2013.01); *H04N 9/3194* (2013.01); *H04N 9/69* (2013.01); *G06T 2207/20208* (2013.01); *G09G 2320/0238* (2013.01); *G09G 2320/0276* (2013.01);
(Continued)

(58) Field of Classification Search
CPC .......... H04N 9/69; H04N 9/85; H04N 9/3182; H04N 9/3185; H04N 9/3188; H04N 9/3194; H04N 19/18; H04N 19/60; H04N 19/85; H04N 19/102; H04N 19/142; H04N 19/146; H04N 19/154; H04N 19/162; H04N 19/179; H04N 19/182; H04N 19/184;
(Continued)

(56) References Cited

U.S. PATENT DOCUMENTS

2016/0292834 A1* 10/2016 Tsuru ...................... H04N 9/69
2017/0092229 A1   3/2017 Greenebaum et al.
(Continued)

FOREIGN PATENT DOCUMENTS

EP        1 942 680 A2    7/2008
GB        2 539 917 A     1/2017
WO    WO 2016/183098 A1  11/2016

OTHER PUBLICATIONS

International Search Report and Written Opinion for Application No. PCT/EP2018/052530 dated Mar. 20, 2018, 10 pages.

*Primary Examiner* — Sultan Chowdhury
(74) *Attorney, Agent, or Firm* — Alston & Bird LLP

(57) ABSTRACT

The present invention relates to the introduction, in an electro-optical transfer function that converts an encoded signal into an output signal, of a first calibration parameter that is determined based on a measurement of a luminance of black performed in the film theatre. Thanks to the invention, the movie image takes into account the actual conditions that affect the black rendering in the theatre.

15 Claims, 4 Drawing Sheets

(51) Int. Cl.
  *G09G 5/02* (2006.01)
  *G09G 5/10* (2006.01)
  *H04N 9/69* (2006.01)

(52) U.S. Cl.
  CPC ............... *G09G 2320/0673* (2013.01); *G09G 2320/0693* (2013.01)

(58) Field of Classification Search
  CPC .......... H04N 19/186; G09G 5/02; G09G 5/12; G09G 5/20; G09G 5/026
  See application file for complete search history.

(56) References Cited

U.S. PATENT DOCUMENTS

2017/0180694 A1* 6/2017 Stauder ................ H04N 19/186
2019/0027082 A1* 1/2019 Van Belle ............ G09G 3/2003

* cited by examiner

SIGNAL ENCODING AND DECODING FOR HIGH CONTRAST THEATRICAL DISPLAY

CROSS-REFERENCE TO RELATED APPLICATIONS

This application is a national stage application filed under 35 U.S.C. § 371 of International Application No. PCT/EP2018/052530 filed 1 Feb. 2018, which claims priority to European Application No. EP17305208.5 filed 24 Feb. 2017, which applications are each hereby incorporated by reference in their entireties.

FIELD OF THE INVENTION

The present invention relates to signal encoding and decoding for theatrical display. More specifically, the invention relates to a method for determining an output signal used to modulate the light intensity of the pixels of images in a movie projected in a film theatre.

BACKGROUND OF THE INVENTION

Nowadays, in the context of digital cinema movies are provided to cinemas under digital format, for example as computer files comprising movie information. The movie information is processed by a digital system and then the movie is projected on a screen in the darkness of a film theatre. Though, the restitution of the movie image in the film theatre depends on various projection conditions: e.g. the projection system, the theatre itself, their interaction . . . . For example, the emergency exit lights, the reflection of the light from the screen on the bright and/or glossy surface of the theatre, the quality of the projector lens influence the perceived image projected on screen. As a consequence, depending on certain conditions of the cinema, the image projected on the screen will be more or less faithful to the precise intention of the movie creative team (director, director of photography . . . ).

SUMMARY OF THE INVENTION

An object of the invention is to improve the image viewed by the audience in a film theatre in order to make it closer to the original intent.

According to a first aspect, the invention provides a method for determining an output signal used to set the light intensity of pixels in a projection of a movie in a film theatre, and comprising the steps of:
  (a) providing an input encoded signal comprising movie information to a computing unit, and
  (b) determining, in the computing unit, an output signal that is dependent on the input encoded signal using an electro-optical transfer function,
characterized in that the electro-optical transfer function depends on a first calibration parameter determined on a basis of a value of luminance of black measured in the film theatre.

The output signal modulates the light intensity of the pixels of the image projected in the film theatre to obtain the desired light intensity on screen. Since the value of the first calibration parameter is based on a measurement performed in a given film theatre, its introduction in the electro-optical transfer function makes possible to take into account the actual specific projection conditions of that given film theatre in the restitution of the movie. In other words, the first calibration parameter causes a predistortion, or compensation, of the light intensity of the pixels of the projected image such that the image perceived in the film theatre is, after distortion due to the conditions in the film theatre, very close to the intention of the movie creative team. The light intensity of a pixel on the screen results from the combination of the light intensities of the three colour values of said pixel.

For example, the actual contrast on the projection screen can be modified by the quality of the light source (xenon bulb for example), by emergency exit lights, and by bright and/or glossy surfaces in the film theatre which reflect the light from the screen. The glass of the projection booth can for example influence this actual contrast. The invention makes possible to take into account all these factors in the output signal and thus in the light intensity of the image that is actually projected on the screen of the specific film theatre.

Projection systems themselves can also substantially differ from one film theatre room to another (depending e.g. on proprietary projection technologies such as DLP™, SXRD™), which is likely to influence e.g., the luminance of black. This influence is also taken into account in the method of the invention.

The high contrast that is achievable with recent projection systems is better than with previous projection systems. Thanks to that, the darkness of the black as it appears on screen is now better than it used to be. However, the darkness of black as it appears on screen was so far technically limited by the influence of the film theatre itself. The invention solves this problem by taking into account the luminance of black in the electro-optical transfer function and thus in the light intensity of the pixels of the projected image.

The movie is preferably an HDR movie. The invention is especially useful in HDR technologies where the achievable level of black is better than in SDR (Standard Dynamic Range) technologies.

Using a first calibration parameter in the electro-optical transfer function makes possible that all colours are corrected in the same way. All projected colours are therefore "darker" or "brighter" as function of the measurement outcome.

The measurement to determine the first calibration parameter is preferably performed with a projection system used in a given film theatre. The measurement to determine the first calibration parameter is preferably performed with average realistic movie public projection conditions, for example, when the safety lights are on.

There may be one or several measurement(s) to determine the first calibration parameter. The measurement(s) may directly provide the value of the first calibration parameter or they may provide measurement data that are then used to determine the value of the first calibration parameter.

Preferably, first calibration parameter is independent on the movie.

The first calibration parameter is preferably determined on the basis of a measured data that relates to at least one of the projector, the film theatre, a porthole between the projector and the film theatre, and the projection screen.

The method according to the invention is intended to be used in film theatres and not at home with consumer electronics such like television screens. In film theatres, the audience expects a grandiose viewing experience and there is a lot of pressure to get an image where the black is really black.

Step (b) is preferably performed after step (a). The measurement of the luminance of black is preferably performed before step (a) or between steps (a) and (b).

The application of the electro-optical transfer function can be referred to as a "decoding" or "gamma decoding". The electro-optical transfer function is applied on each three colour values of each pixel of the movie images carried by the input encoded signal.

The projection screen is preferably a unicolour piece of material, for example white. Preferably, it is a passive object, i.e., an object that is does not contain electronics. The surface that reflects the image is preferably a piece of coated fabric.

The film theatre can also be called "auditorium" or "cinema room".

In an embodiment of the invention, the first calibration parameter is the value of the luminance of black. In an embodiment of the invention, the first calibration parameter is the contrast ratio.

In an embodiment of the invention, the measurement of the value of the luminance of black is performed when a full black image is projected in the film theatre.

A full black image corresponds to the darkest black achievable for that film theatre with that projection system. A full black image does not correspond to a situation wherein the projector is switched off.

In an embodiment of the invention, the electro-optical transfer function depends on a second calibration parameter determined on a basis of a value of luminance of peak white. The value of luminance of peak white may be measured in the film theatre or it can be set equal to a predetermined value. This predetermined value can be a standard value, like the peak white standard value existing in SDR. This predetermined value can be a target value, for example a value considered as a target for a given technology. In case the value of luminance of peak white is measured, this measurement is performed with a full white image. It is performed at another time that the measurement of the value of luminance of black. The luminance of black and the luminance of peak white can be said "sequential" because they are measured one after each other.

The contrast ratio can be directly deduced from the luminance of peak white and the luminance of black. The contrast ratio is the ratio between the luminance of peak white and the luminance of black. The measurement of the luminance of peak white is preferably performed before step (a) or between steps (a) and (b).

In an embodiment of the invention, the method includes the step of determining a new value of the first calibration parameter upon maintenance of the projector and/or when lighting conditions in the theatre room are modified, based on a new measurement. The new value of the first calibration parameter is then used for every movie projection after the maintenance of the projector or after the modifications in the lighting conditions of the film theatre. A new value of the first calibration parameter is also preferably determined every time the film theatre is substantially modified.

In an embodiment of the invention, the method includes the step of determining a new value of the second calibration parameter upon maintenance of the projector and/or when lighting conditions in the theatre room are modified, based on a new measurement. The new value of the second calibration parameter is then used for every movie projection after the maintenance of the projector or after the modifications in the lighting conditions of the theatre room.

A new value of the second calibration parameter is also preferably determined every time the theatre room is substantially modified.

In an embodiment of the invention, the method includes the step of determining a new value of the first calibration parameter and/or the second calibration parameter, based on a new measurement when lighting conditions in the film theatre are modified.

The lighting conditions relate to any light source that can be reflected by the screen: light coming from doors, light of emergency exits, staircases, . . . .

In an embodiment of the invention, the method comprises the following steps before step (a):
providing an input signal comprising movie information,
determining an initial encoded signal that depends on the input signal using an opto-electrical transfer function, and
determining the input encoded signal based on the initial encoded signal.

The input encoded signal may be equal to the initial encoded signal.

The application of the opto-electrical transfer function can be referred to as "coding", "encoding" or "gamma encoding".

In an embodiment of the invention, the electro-optical transfer function is a power function with a power coefficient, gamma, strictly higher than one.

Without the power function the images would carry too many code values for bright colours that humans cannot differentiate, and too few code values for dark colours that humans can well differentiate. This power function is there to optimize sampling of the signal rather than cancelling the non-linearity of a display.

The opto-electrical transfer function is preferably a power function with a power coefficient equal to one divided by the power coefficient of the electro-optical transfer function, i.e., equal to one divided by gamma.

Preferably, the power coefficient is comprised between 2.6 and 3, preferably between 2.7 and 2.9, more preferably gamma is equal to 2.8. More preferably, the power coefficient is comprised strictly between 2.6 and 3, preferably strictly between 2.7 and 2.9.

The inventors have found that this range of power coefficient gives a good trade-off between the contrast in dark areas and the contrast in bright areas for high dynamic range digital cinema. The value of 2.8 especially allows getting a better spread of electrical signal values across the range of possible image signal intensity with most recent high contrast digital cinema projectors. It therefore allows high efficiency of signal compression by optimising the encoded signal in the range that is most critical to the viewing environment. These values of gamma can be used even if the electro-optical transfer function is independent of the luminance of black.

In an embodiment of the invention, the electro-optical transfer function is $$L_{proj} = (L_{pw}^{1/gamma} - L_b^{1/gamma})^{gamma} (\max[(V+b), 0])^{gamma}$$

where b is given by $$b = \frac{L_b^{1/gamma}}{L_{pw}^{1/gamma} - L_b^{1/gamma}},$$

gamma is the power coefficient, $L_{pw}$ is the second calibration parameter, and $L_b$ is the first calibration parameter. $L_{pw}$ is the luminance of peak white. $L_b$ is the luminance of black. $L_{proj}$ is a luminance indicated by the output signal. V is an intensity indicated by the input encoded signal. Each of the three colour values of a pixel of an image of the movie is characterized by a value of V. The output signal is used to modulate the corresponding colour intensities of the corresponding pixels. b does not depend on the movie, on the image or on the pixel, it depends only on the projection conditions in the film theatre.

The electro-optical transfer function could be any other electro-optical transfer function.

In an embodiment of the invention, the method further comprises the step of converting a first signal, which carries movie information, to a second signal, the first signal being in a first colour gamut and the second signal being in a second colour gamut that is larger than the first colour gamut and smaller than the gamut of the CIE XYZ colour space. The first colour gamut is preferably the colour gamut used to perform the mastering of the movie. It can be called "mastering colour gamut". It may be the DCI-P3 colour gamut. The second colour gamut can be, for example, the ACES-AP1 colour gamut.

The first signal can also be called "first colour signal". The second signal can also be called "second colour signal".

The inventors have found that it is inefficient to transport the movie information in the gamut of the CIE XYZ colour space because the movie information uses only a small part of the gamut of the CIE XYZ colour space. It results in the transport of a lot of irrelevant code values. The inventors propose to use, for the transport of the movie information, a second colour gamut that is larger than the first colour gamut and smaller than the gamut of the CIE XYZ colour space, for example the ACES-AP1 colour gamut. It improves the encoding efficiency.

This embodiment of the transport of the movie information can be performed whatever the method used to determine the output signal.

Preferably, if white in the first colour gamut does not coincide with white in the second colour gamut and if the volume of the first colour gamut is not included in the volume of the second colour gamut, the conversion includes a scaling of the signal prior to the conversion to the second colour gamut. For example, scaling by a factor of 1/1.09 makes possible for an ACES-AP1 colour volume to include all combinations of DCI-P3 RGB primaries.

The invention also provides a method for displaying a movie on a projection screen of a film theatre and comprising the steps of:
  determining an output signal,
  setting the light intensity of the pixels in an image projected by a projector according to the determined output signal, and
  projecting, with the projector, the movie onto a projection screen of the film theatre.

According to a second aspect, the invention provides a computing unit comprising means for carrying out a method according to any of the embodiments of the invention.

The computing unit may be a computer. The computing unit may be attached to a printed circuit board. The computing unit may be included in a projector. The computing unit may comprise a plurality of computing devices possibly located remote from each other.

According to a third aspect, the invention provides a computer comprising instructions which, when the program is executed by a computing unit, cause the computer to carry out a method according to any of the embodiments of the invention.

According to a fourth aspect, the invention provides a computer-readable storage medium comprising instructions which, when executed by a computing unit, cause the computing unit to carry out a method according to any of the embodiments of the invention.

In an embodiment of the invention, the invention provides a method to determine an output signal used to set the light intensity of pixels of movie projection in a film theatre, and comprising the steps of:
(i) measuring a luminance of black in the film theatre,
(ii) determining a first calibration parameter based on a result of step (i),
(iii) providing an input encoded signal comprising the movie information to a computing unit, and
(iv) determining, in the computing unit, an output signal using an electro-optical transfer function that is dependent on the input encoded signal and on the first calibration parameter.

In an embodiment of the invention, the invention provides a method to determine an output signal used to set the light intensity of pixels of movie projection in a film theatre, and comprising the steps of:
(i) measuring a luminance of black in the film theatre,
(ii) measuring a luminance of peak white in the film theatre,
(iii) determining a first calibration parameter based on a result of step (i),
(iv) determining a second calibration parameter based on a result of step (ii),
(v) providing an input encoded signal comprising the movie information to a computing unit, and
(vi) determining, in the computing unit, an output signal using an electro-optical transfer function that is dependent on the input encoded signal, on the first calibration parameter and on the second calibration parameter.

BRIEF DESCRIPTION OF THE FIGURES

For a better understanding of the present invention, reference will now be made, by way of example, to the accompanying drawings in which.

DESCRIPTION OF THE INVENTION

Figure 1:
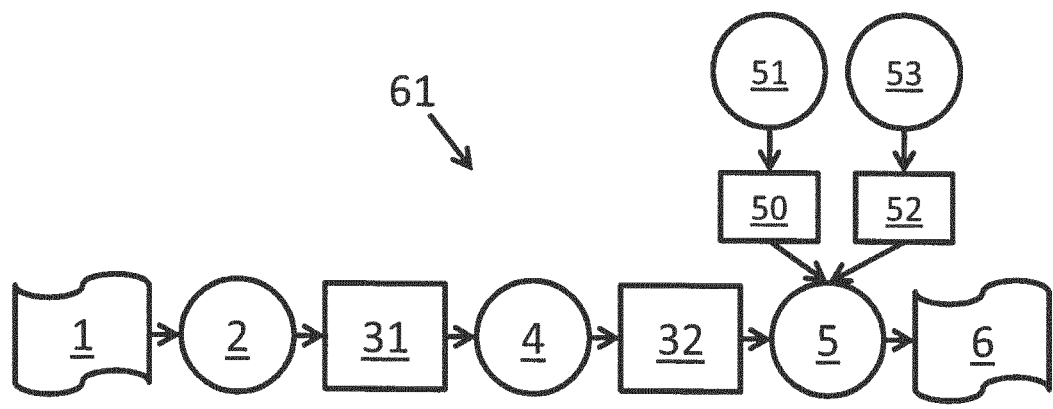
FIG. 1 is a schematic flowchart of a first process for handling movie information according to an embodiment of the invention, FIG. 2 schematically illustrates the film theatre and a projection booth of the cinema, as involved in an embodiment of the invention.

The present invention will be described with respect to particular embodiments and with reference to certain drawings but the invention is not limited thereto. The drawings described are only schematic and are non-limiting. In the drawings, the size of some of the elements may be exaggerated and not drawn on scale for illustrative purposes.

Furthermore, the terms first, second, third and the like in the description and in the claims, are used to distinguish between similar elements and not necessarily to describe a sequential or chronological order. The terms are interchangeable under appropriate circumstances and the embodiments of the invention can operate in other sequences than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

On the figures, identical or analogous elements may be referred by a same number.

In the frame of the present document, a "signal" is preferably a digital piece of information. It is preferably comprised in a computer file.

In the frame of the present document, a "digital image" is preferably a computer file or a part of computer file.

In the frame of the present document, the expression "movie information" indicates information of a movie, i.e., a moving visual medium to be projected in cinemas. The movie information preferably includes a succession of digital images, each image being made of pixels and each pixel being characterized by three colour values. The three colour values can be, for example, RGB values or XYZ values.

In the frame of the present document, a projector is preferably a digital cinema projector.

In the frame of the present document, a projection system comprises a projector and a projection screen. It may also comprise a porthole between the projector and the projection screen. It may also comprise a server.

In the frame of the present document, a cinema is a facility that comprises at least one film theatre. It preferably comprises also one projection booth with a projector for each film theatre.

In the frame of the present document, the expression "peak white" means the brightest colour that a system is able to produce after calibration.

FIG. 1 is a schematic flowchart of a first process 61 for handling movie information according to an embodiment of the invention. The first process 61 can be called the "coding chain" of the movie.

An input signal 1, which indicates a luminance $L_{init}$, is transformed 2 into an initial encoded signal 31, which indicates an intensity $V_{init}$. Each colour value of each pixel of each image of the movie corresponds to a value of $L_{init}$ and thus to a value of $V_{init}$. The transformation 2 is preferably performed in a studio or in a movie-making facility.

In an embodiment of the invention, this transformation 2 is performed through an opto-electrical transfer function. A possible opto-electrical transfer function is $$V_{init} = \frac{L_{init}^{1/gamma} - L_{br}^{1/gamma}}{L_{pwr}^{1/gamma} - L_{br}^{1/gamma}}$$

where:
gamma is a power coefficient higher than one,
$L_{pwr}$ is a reference value of peak white, and
$L_{br}$ is a reference value of black.
$V_{init}$ is equal to zero when $L_{init}=L_{br}$, i.e., for reference black. $V_{init}$ is equal to one when $L_{init}=L_{pwr}$, i.e., for reference peak white.

Gamma is preferably strictly comprised between 2.6 and 3, more preferably between 2.7 and 2.9. Even more preferably, gamma is equal to 2.8.

In an embodiment of the invention, $L_{pwr}$ is the value of the luminance of peak white for a reference projector. In an embodiment of the invention, $L_{pwr}$ is a standard value of the luminance of peak white. In an embodiment of the invention, $L_{br}$ is a standard value of the luminance of black.

Figure 2:
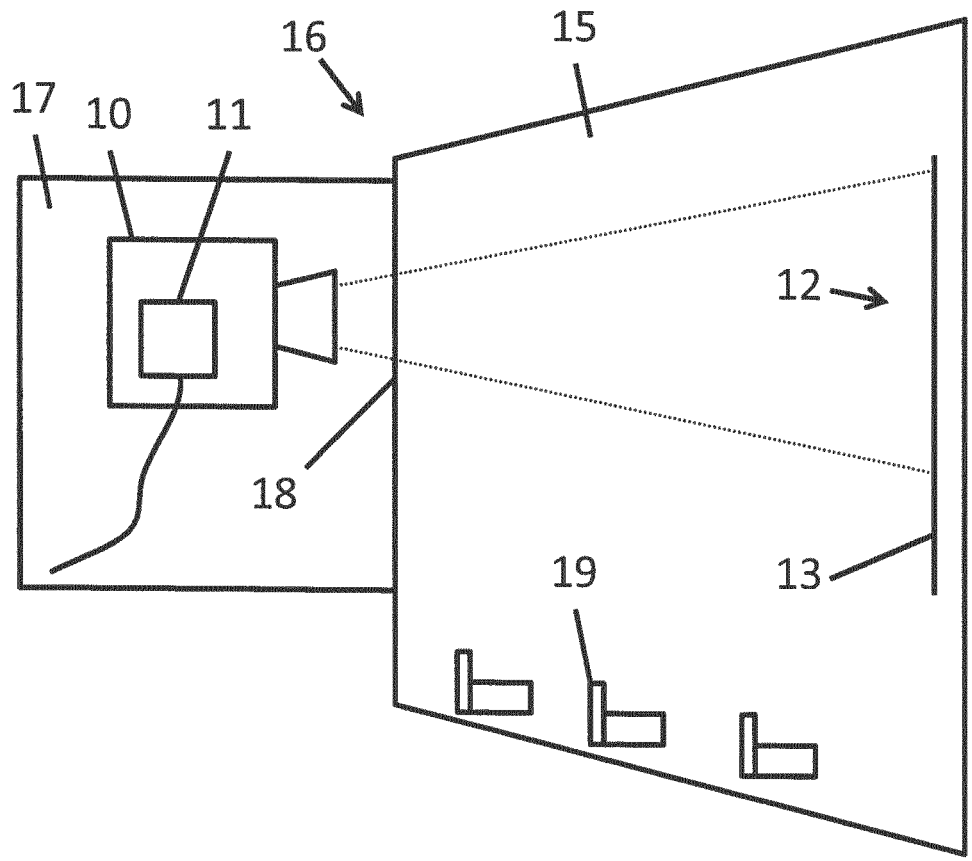

The input signal 1 comprises movie information about a movie 12 (visible FIG. 2). This movie information is also comprised in the initial encoded signal 31. The movie information is preferably HDR movie information.

The power lower than one (because gamma is higher than one) provides a better sampling in V for the values of low luminance than of high luminance. That corresponds to the human eye perception where differences in dark tones are better perceived than difference in bright tones.

The initial encoded signal 31 goes then through a handling and transport process 4 that transports the movie information to a cinema 16 (visible FIG. 2). The handling and transport process 4 may include a compression of the signal. Part of the handling and transport process may be performed a computing unit 11 (visible FIG. 2) located in the cinema 16. The handling and transport process 4 is not supposed to modify the initial encoded signal 31. However, in practice, it may slightly modify it and the output of the handling and transport process 4 is the input encoded signal 32. Therefore, the handling and transport process 4 provides the movie information in the form of the input encoded signal 32. In other words, in case the handling and transport process 4 does not modify the initial encoded signal 31, the input encoded signal 32 is equal to the initial encoded signal 31.

In the cinema 16, the input encoded signal 32 is determined in the computing unit 11 or provided to the computing unit 11 (visible FIG. 2). The computing unit 11 may be comprised in a projector 10 (visible FIG. 2). The computing unit 11 determines 5 an output signal 6 from the input encoded signal 32. The determination 5 of the output signal 6 by the electro-optical transfer function takes as inputs the input encoded signal 6 and a first calibration parameter 50. The value of this first calibration parameter 50 was previously determined based on a first measurement 51 performed in the film theatre 15 (visible FIG. 2). The electro-optical transfer function may also use as input a second calibration parameter 52. The value of this second calibration parameter 52 was previously determined based on a second measurement 53 performed in the film theatre 15 (visible FIG. 2). The output signal 6 comprises the movie information. The output signal 6 may be called a "decoded signal".

The output signal 6 is then used to modulate the light intensity of the image projected on the screen 13. For example, the output signal 6 is used to modulate a light source of the projector 10.

FIG. 2 schematically illustrates the film theatre 15 and a projection booth 17 of the cinema 16, as involved in an embodiment of the invention. The projector 10 is preferably located in the projection booth 17. The projection booth 17 may be separated from the film theatre 15 by a porthole 18. The film theatre 15 comprises seats 19, a projection screen 13 on which a movie 12 is projected and typically safety lighting (not-shown). The film theatre 15 often also comprises light sources integrated in staircases or other light sources.

Referring to the determination 5 of the output signal 6 illustrated at FIG. 1, this determination 5 is preferably performed through an electro-optical transfer function that provides the luminance $L_{proj}$ of the output signal 6 as function of a normalized intensity V provided by the input encoded signal 32. Each colour value of each pixel of each image of the movie corresponds to a value of V and thus to a value of $L_{proj}$. In an embodiment of the invention, the electro-optical transfer function is written as $$L_{proj} = (L_{pw}^{1/gamma} - L_b^{1/gamma})^{gamma} (\max[(V+b),0])^{gamma}$$

where b is given by $$b = \frac{L_b^{1/gamma}}{L_{pw}^{1/gamma} - L_b^{1/gamma}}$$

and gamma is the coefficient that was used in the opto-electrical transfer function for the encoding, $L_{pw}$ is the value of the luminance of peak white, and $L_b$ is the value of the luminance of black measured 51 on the screen 13 of the film theatre 15.

In an embodiment of the invention, $L_b$ is the first calibration parameter 50. In an embodiment of the invention, $L_{pw}$ is the second calibration parameter 52.

$L_b$ is preferably measured 53 in the film theatre 15. More preferably, $L_b$ is—measured 53 on the screen 13 of the film theatre 15. In an embodiment of the invention, $L_b$ is measured 51 when the projector 10 projects a full black image. The full black image is an image where V is equal to zero for all pixels.

In an embodiment of the invention, $L_{pw}$ is measured 53 when the projector 10 projects a full peak white image. In another embodiment of the invention, $L_{pw}$ is given a predetermined value. This predetermined value may be a target value that is supposed to be achieved with a given technology. This predetermined value may also be a value provided by a standard, a norm or a reference.

The contrast ratio, CR, can be written as $$CR = \frac{L_{pw}}{L_b}$$

In an embodiment of the invention the measurement(s) to determine the calibration parameter(s) is (are) performed at each maintenance the projector 10, or every time a change that may affect the luminance of black happens in the film theatre 15.

Before a movie 12 is publicly projected in cinemas, the creative team of the movie 12 watches it in a grading room, for example to decide on the value of a diffuse white to be used in a scene. Preferably, the determination 5 of the output signal 6 according to the invention is also applied in the grading room, with a first calibration parameter 50 that was determined in that grading room and possibly with a second calibration parameter 52. Therefore, the artistic choices made by the creative team are made on an image that is adjusted, according to the invention, for the grading room; and the audience sees the movie with an image that is adjusted, according to the invention, for a public film theatre. Consequently, the audience sees the movie with an image that is more respectful of the artistic choice of the creative team.

Figure 3:
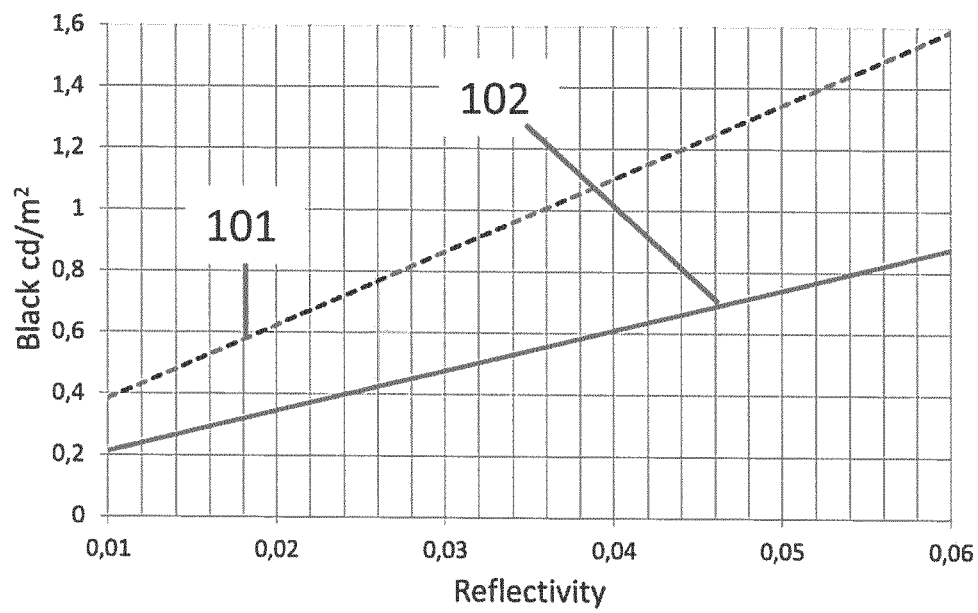
FIG. 3 illustrates the luminance of black achievable in Standard Dynamic Range (SDR) and in High Dynamic Range (HDR), as function of the reflectivity of the film theatre.

FIG. 3 illustrates the luminance of black achievable in Standard Dynamic Range (SDR) 101 and in HDR 102, as function of the reflectivity of the film theatre 15. It appears that a much darker black is achievable in HDR than in SDR thanks to new projector technologies. It also appears that the quality of black can be adversely affected by the reflectivity of the film theatre 15.

Figure 4:
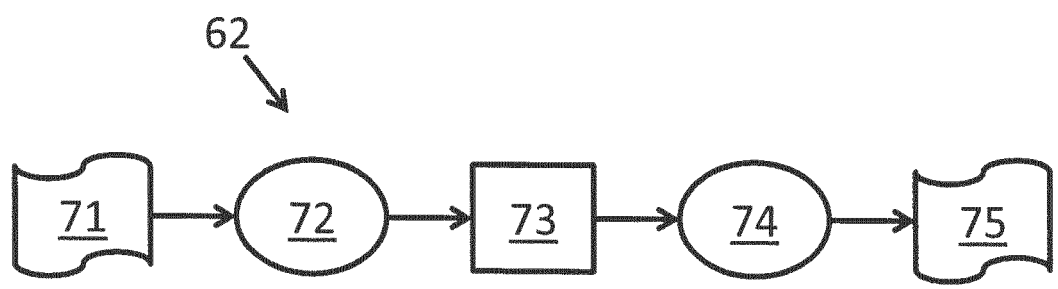
FIG. 4 is a schematic flowchart of a second process for handling movie information according to an embodiment of the invention.

FIG. 4 is a schematic flowchart of a second process 62 for handling movie information according to an embodiment of the invention.

A first signal 71, in a first colour gamut, is converted 72 in a second signal 73. The first colour gamut is preferably the DCI-P3 colour gamut or the Rec 2020 colour gamut. The second signal 73 is in a second colour gamut. The second colour gamut is larger than the first colour gamut and smaller than the gamut of the CIE XYZ colour space. In an embodiment of the invention, the second colour gamut is the ACES-AP1 colour gamut. Preferably, the second colour gamut is larger than the Rec 709 colour space and the Rec 2020 colour space.

In an embodiment of the invention, the colour conversion 72 from the first to the second colour gamut and the inverse conversion 74 use 3 rows 3 columns matrices. In the case where the first colour gamut is DCI-P3 and the second colour gamut is ACES-AP1, the 3 rows 3 columns matrices are very close to unit matrix. This decreases the conversion errors.

If the white in the first colour gamut does not coincide with the white in the second colour gamut and/or if the volume of the first colour gamut is not included in the volume of the second colour gamut, a scaling may be applied to the signal before the conversion 72. For example, if the first colour gamut is DCI-P3 and the second colour gamut is ACES-AP1, the first signal is preferably scaled by a factor equal to or lower than 1/1.09. A scaling factor of 1/1.09 is optimum to make that the ACES-AP1 colour gamut encompasses all colours of the DCI-P3 colour gamut while keeping low the amount of unoccupied colour space in the ACES-AP1 colour gamut.

The second signal 73 is then transported to the cinema 16. The second signal 73 may be for example compressed using DCP JPEG2000 12 bit format. In the cinema 16, the second signal 73 is decompressed and converted 74 to a third signal 75, which is preferably in the first colour gamut.

The second process 62 is preferably used in addition to the first process 61. However, the second process 62 could be used without the first process 61 and the first process 61 could be used without the second process 62.

Figure 5A:
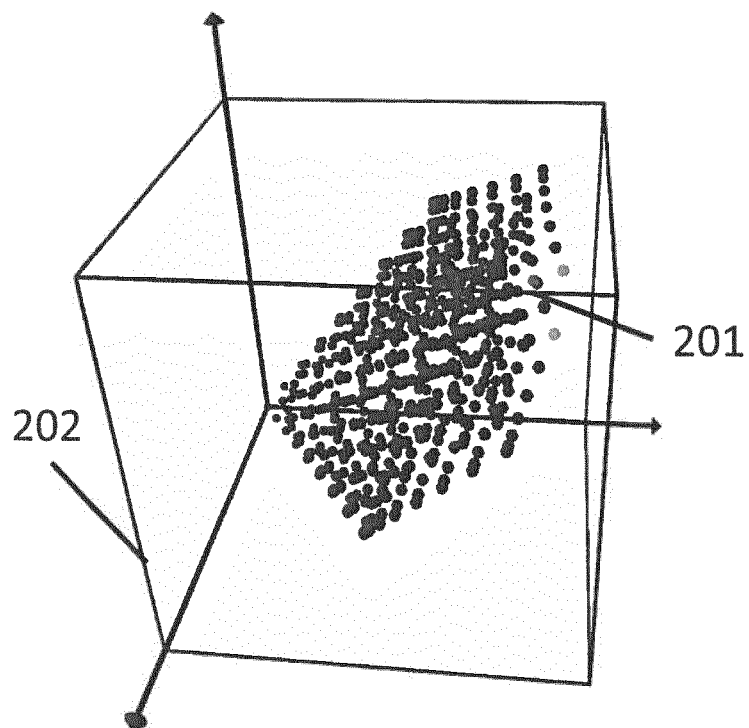
FIG. 5a illustrates the volume of the DCI-P3 colour gamut with respect to the volume of the gamut of the CIE XYZ colour gamut.
Figure 5B:
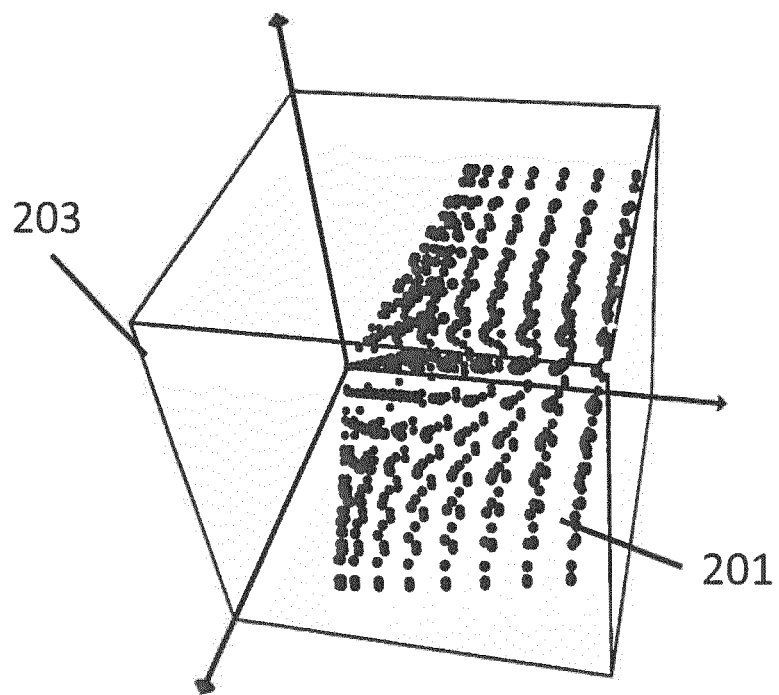
FIG. 5b illustrates the volume of the DCI-P3 colour gamut with respect to the volume of the ACES-AP1 gamut.

FIG. 5*a* illustrates the volume 201 of the DCI-P3 colour gamut with respect to the volume 202 of the gamut of the CIE XYZ colour space. FIG. 5b illustrates the volume 201 of the DCI-P3 colour gamut with respect to the volume 203 of the ACES-AP1 gamut.

Figure 6:
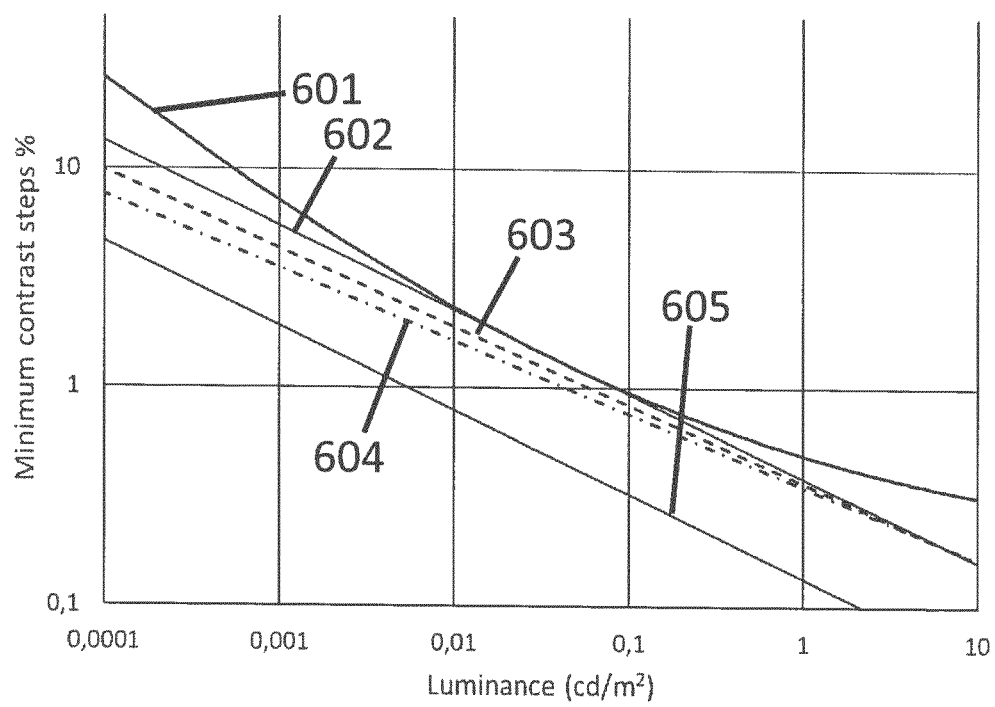
FIG. 6 illustrates the relative minimum contrast step as function of the luminance level.

FIG. 6 illustrates the relative minimum contrast step as function of the luminance level. Curved line 601 is a perceptual quantizer. For any point below this line, contrast steps are invisible and visual gradation of light and shade appear smooth. The first process 61 for handling movie information should therefore introduces contrast steps only below the perceptual quantizer line 601 to avoid that the image includes artefacts related to the process. FIG. 6 illustrates the contrast step lines for various initial encoded signals 31 that differ in the value of the power coefficient gamma. All contrast step lines assume a 12 bits coding in the initial encoded signal 31 (FIG. 1). Some contrast step lines have been determined for HDR, with a peak white at 103 cd/m². One of the step lines has been determined for SDR, with a peak white at 48 cd/m².

Line 602 corresponds to gamma equal to 2.6 in HDR. This line 602 is tangential to the perceptual quantizer line 601. Rounding errors are enough to make this line 602 crosses the perceptual quantizer line 601, resulting in potential perceptual problems.

Line 604 corresponds to gamma equal to 3.0 in HDR. Line 604 is far enough from the perceptual quantizer line 601 to avoid the effect of rounding errors. However, a value of gamma equal to 3.0 or higher is not optimum for the use of code values in the initial encoded signal 31 because there are too many code values allocated to code the dark values. Additionally, this high gamma value generates too large rounding errors at the encoding stage.

Line 603 corresponds to gamma equal to 2.8 in HDR. The inventors have found that this value of gamma provides a line 603 that is far enough from the perceptual quantizer line 601 to avoid the effect of rounding errors and provides an especially efficient use of code values in the initial encoded signal 31.

In general, the inventors have found that, in HDR, values of gamma strictly higher than 2.6 and lower than 3, preferably between 2.7 and 2.9, provide an excellent trade-off to be below the perceptual quantizer line 601 and to provide an efficient use of code values in the resulting signal.

Line 605 corresponds to gamma equal to 2.6 in SDR. Line 605 is far enough from the perceptual quantizer line 601 to avoid the effect of rounding errors.

The inventors have shown that, while keeping the signal encoding to 12 bit considering nominal white comparable to the peak white used in SDR digital cinema (48 cd/m2) the level of precision is comparable to the one in DCI encoding despite the lower black level.

In other words, the invention relates to the introduction, in an electro-optical transfer function that converts an encoded signal 32 into an output signal 6, of a first calibration parameter 50 that is determined based on a measurement 51 of a luminance of black performed in the film theatre 15. Thanks to the invention, the movie image takes into account the actual conditions that affect the black rendering in the theatre 15.

Although the present invention has been described above with respect to particular embodiments, it will readily be appreciated that other embodiments are also possible.

The invention claimed is:

1. A method for determining an output signal used to set the light intensity of pixels in a projection of a movie in a film theatre, comprising the steps of:
    (a) providing an input encoded signal comprising movie information to a computing unit, and
    (b) determining, in the computing unit, an output signal that is dependent on the input encoded signal using an electro-optical transfer function,
    wherein the electro-optical transfer function depends on a first calibration parameter determined on a basis of a value of luminance of black measured in the film theatre.

2. The method according to claim 1, wherein the measurement of the value of luminance of black was performed when a full black image was projected in the film theatre.

3. The method according to claim 1, wherein the electro-optical transfer function depends on a second calibration parameter determined on a basis of a value of luminance of peak white.

4. The method according to claim 1, comprising the step of determining, upon maintenance of the projector, a new value of the first calibration parameter based on a new value of luminance of black measured in the film theatre after the maintenance of the projector.

5. The method according to claim 1, comprising the step of determining, when lighting conditions in the film theatre are modified, a new value of the first calibration parameter based on a new value of luminance of black measured in the film theatre after lighting conditions in the film theatre were modified.

6. The method according to claim 1, comprising the following steps before step (a):
    providing an input signal comprising movie information,
    determining an initial encoded signal that depends on the input signal using an opto-electrical transfer function, and
    determining the input encoded signal based on the initial encoded signal.

7. The method according to claim 1, wherein the electro-optical transfer function is a power function with a power coefficient strictly higher than one.

8. The method according to claim 7, wherein the power coefficient is comprised between 2.6 and 3, preferably between 2.7 and 2.9, more preferably the power coefficient is equal to 2.8.

9. The method according to claim 7, wherein the electro-optical transfer function is $$L_{proj} = (L_{pw}^{1/gamma} - L_b^{1/gamma})^{gamma} (\max[(V+b), 0])^{gamma}$$

wherein b is given by $$b = \frac{L_b^{1/gamma}}{L_{pw}^{1/gamma} - L_b^{1/gamma}},$$

gamma is the power coefficient, $L_{pw}$ is a second calibration parameter determined on a basis of a value of luminance of peak white, and $L_b$ is the first calibration parameter.

10. The method according to claim 1, further comprising the step of converting a first signal, which carries information about the movie, to a second signal, the first signal being in a first colour gamut and the second signal being in a second colour gamut that is larger than the first colour gamut and smaller than the gamut of the CIE XYZ colour space.

11. The method according to claim 10, wherein, if white in the first colour gamut does not coincide with white in the second colour gamut and if the volume of the first colour gamut is not included in the volume of the second colour gamut, the conversion includes a scaling of the signal prior to the conversion to the second colour gamut.

12. The method for displaying a movie on a projection screen of a film theatre and comprising the steps of:
  determining an output signal according to the method according to claim 1,
  setting the light intensity of the pixels in an image projected by a projector according to the determined output signal by modulating a light source of the projector with the determined output signal, and
  projecting, with the projector, the movie onto a projection screen of the film theatre.

13. A computing unit comprising means for carrying out the method according to claim 1.

14. A computing program comprising instructions which, when the program is executed by a computing unit, cause the computing unit to carry out a method for determining an output signal used to set the light intensity of pixels in a projection of a movie in a film theatre, wherein said instructions comprise:
  instructions for receiving an input encoded signal comprising movie information, and
  instructions for determining an output signal that is dependent on the input encoded signal using an electro-optical transfer function, wherein the electro-optical transfer function depends on a first calibration parameter determined on a basis of a value of luminance of black measured in the film theatre.

15. A computer-readable storage medium comprising instructions which, when executed by a computing unit, cause the computing unit to carry out a method for determining an output signal used to set the light intensity of pixels in a projection of a movie in a film theatre, wherein said instructions comprise:
  instructions for receiving an input encoded signal comprising movie information, and
  instructions for determining an output signal that is dependent on the input encoded signal using an electro-optical transfer function, wherein the electro-optical transfer function depends on a first calibration parameter determined on a basis of a value of luminance of black measured in the film theatre.

* * * * *